Feb. 6, 1951 B. E. DEL MAR 2,540,659
HYDRAULIC PLANETARY SLIP DRIVE
Filed Jan. 29, 1944 3 Sheets-Sheet 1

INVENTOR.
BRUCE E. DEL MAR
BY J. Edwin Coates
ATTORNEY.

Feb. 6, 1951     B. E. DEL MAR     2,540,659
HYDRAULIC PLANETARY SLIP DRIVE
Filed Jan. 29, 1944     3 Sheets-Sheet 2
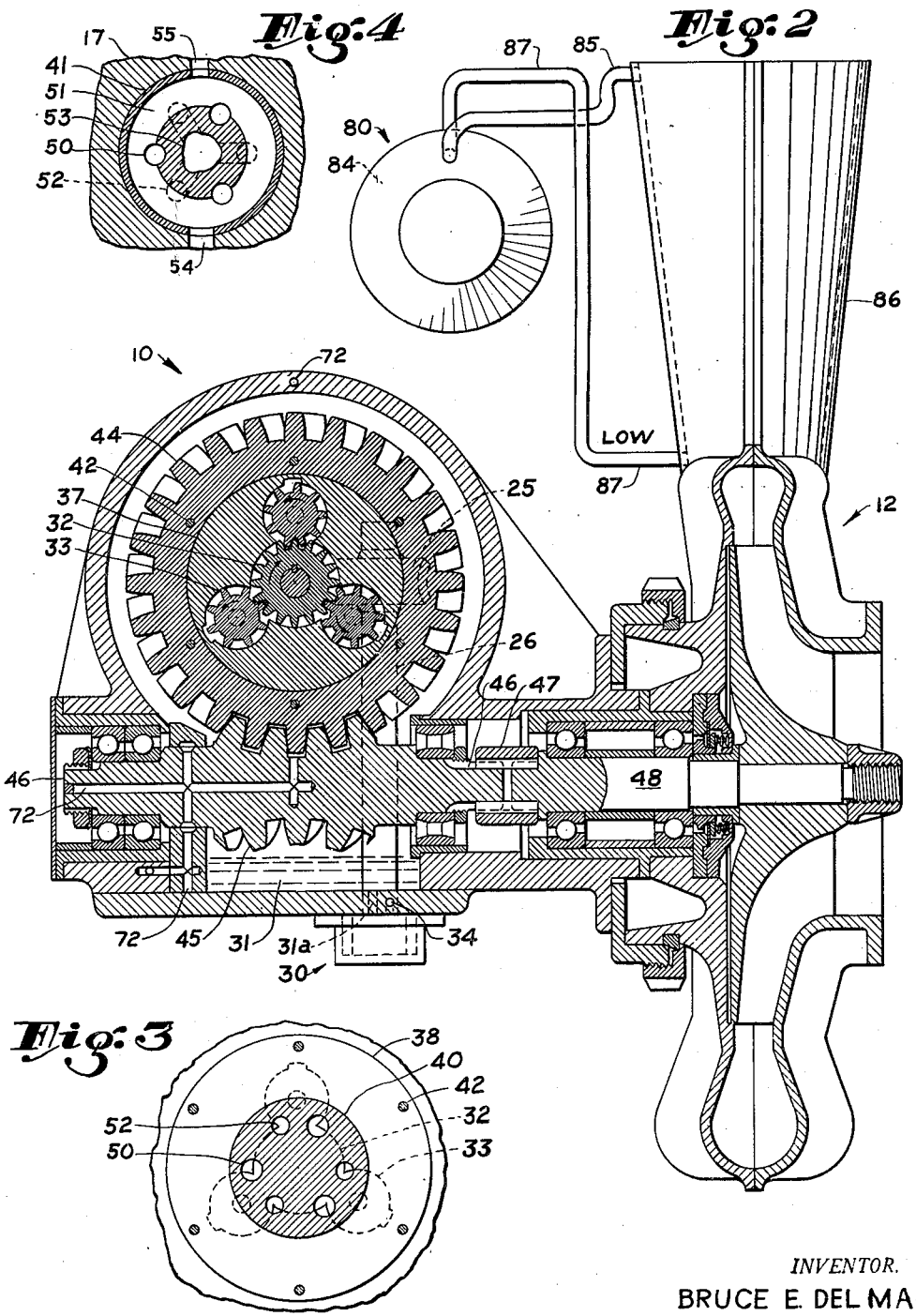
INVENTOR.
BRUCE E. DEL MAR
BY J. Edwin Coates
ATTORNEY.

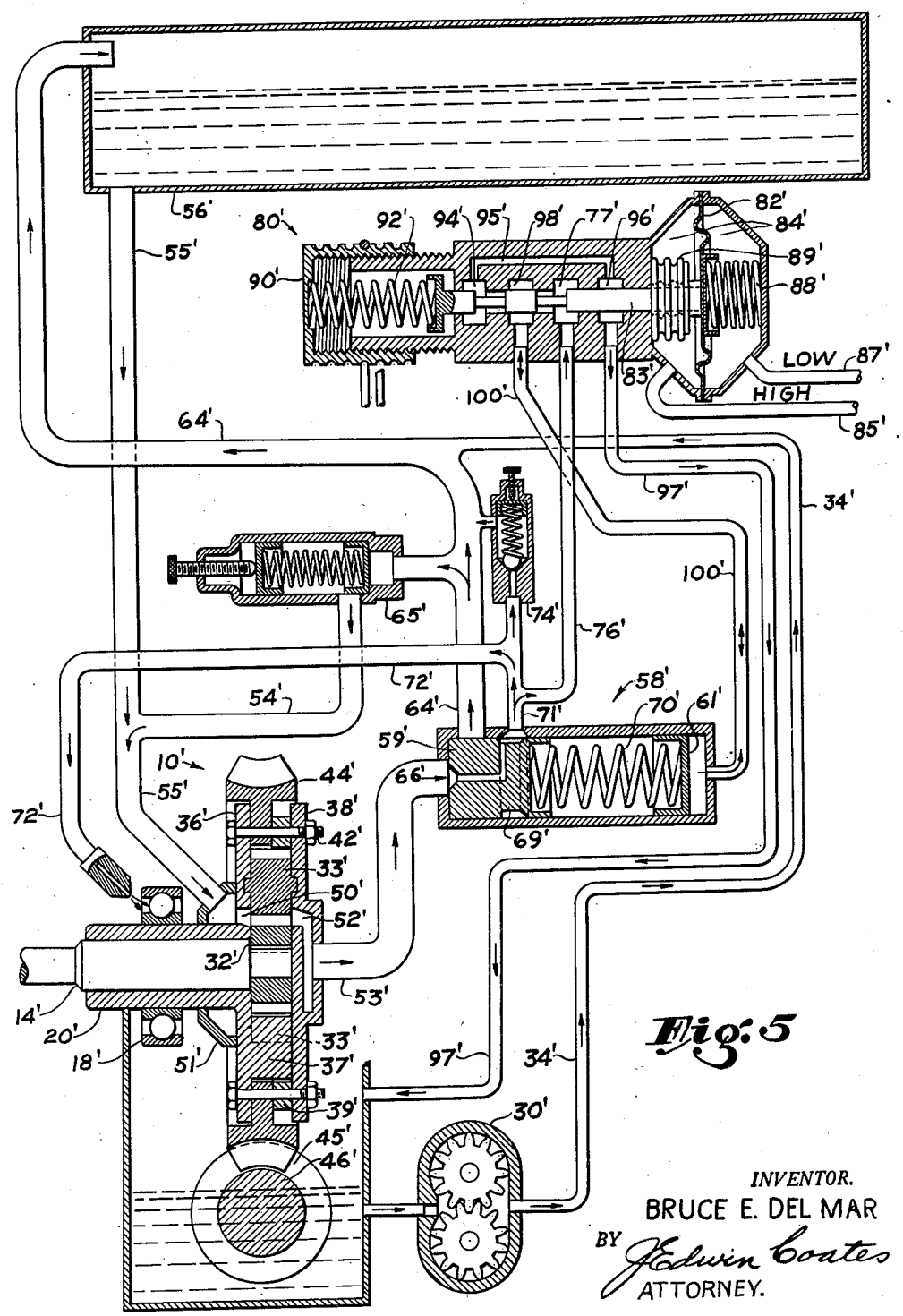

Patented Feb. 6, 1951

2,540,659

UNITED STATES PATENT OFFICE 2,540,659

HYDRAULIC PLANETARY SLIP DRIVE

Bruce E. Del Mar, Los Angeles, Calif., assignor to Douglas Aircraft Company, Inc., Santa Monica, Calif.

Application January 29, 1944, Serial No. 520,345

11 Claims. (Cl. 192—61)

This invention relates to a hydraulic planetary slip drive for maintaining a driven member at a constant or regulated speed.

The chief object of the invention is to improve and simplify the design and operation of the drive ordinarily employed for a supercharger used in a system for controlling the circulation or pressure of the air in the pressure cabin of an airplane. In some systems already proposed for controlling such circulation or pressure, a set of planetary gears and a hydraulic gear pump are interposed between the main engine drive and the supercharger for driving the supercharger at a constant or regulated speed. In one of these systems, the planet gears of the planetary system are driven by the airplane engine, the sun gear drives the supercharger, while the orbit or ring gear drives the hydraulic gear or slip pump. In another known system, the engine drives the orbit gear, the planetary gears drive the oil pump, while the sun gear drives the supercharger. By controlling the resistance to the flow of oil which passes through the gear pump, the speed of the supercharger can be kept constant or regulated, regardless of variations in the engine speed.

Another object of my invention is to design and use the sun gear and planetary gears of the planetary system to perform the additional function of pumping the oil through the system, thereby completely eliminating the housing and gears of the gear or slip pump in the existing systems. This results in a substantial saving in weight and material, and a gain in the overal efficiency.

Another object of one embodiment of my invention is to further reduce the weight and number of parts of the system by locating the intake and discharge ports of the oil pump in one of the shaft members fixed to the orbit gear.

Another object of a different embodiment of my invention is to further reduce the weight and leakage of the system by eliminating all high pressure glands in the slip pump hydraulic circuit through mounting the planetary slip pump load relief valve in contact with the orbit gear shaft member containing the discharge port of the planetary slip pump, thereby retaining all high pressure within the orbit gear shaft member.

An additional object of my invention is to obtain the most desirable and compact arrangement of the unit by positioning the load relief valve in axial alignment with said shaft member or the orbit gear.

In the drawings:

Figure 2 is a vertical sectional view on line 2—2 of Figure 1, and including diagrammatic showings of the oil sump gear pump and the automatic air flow control valve.

Figure 1:
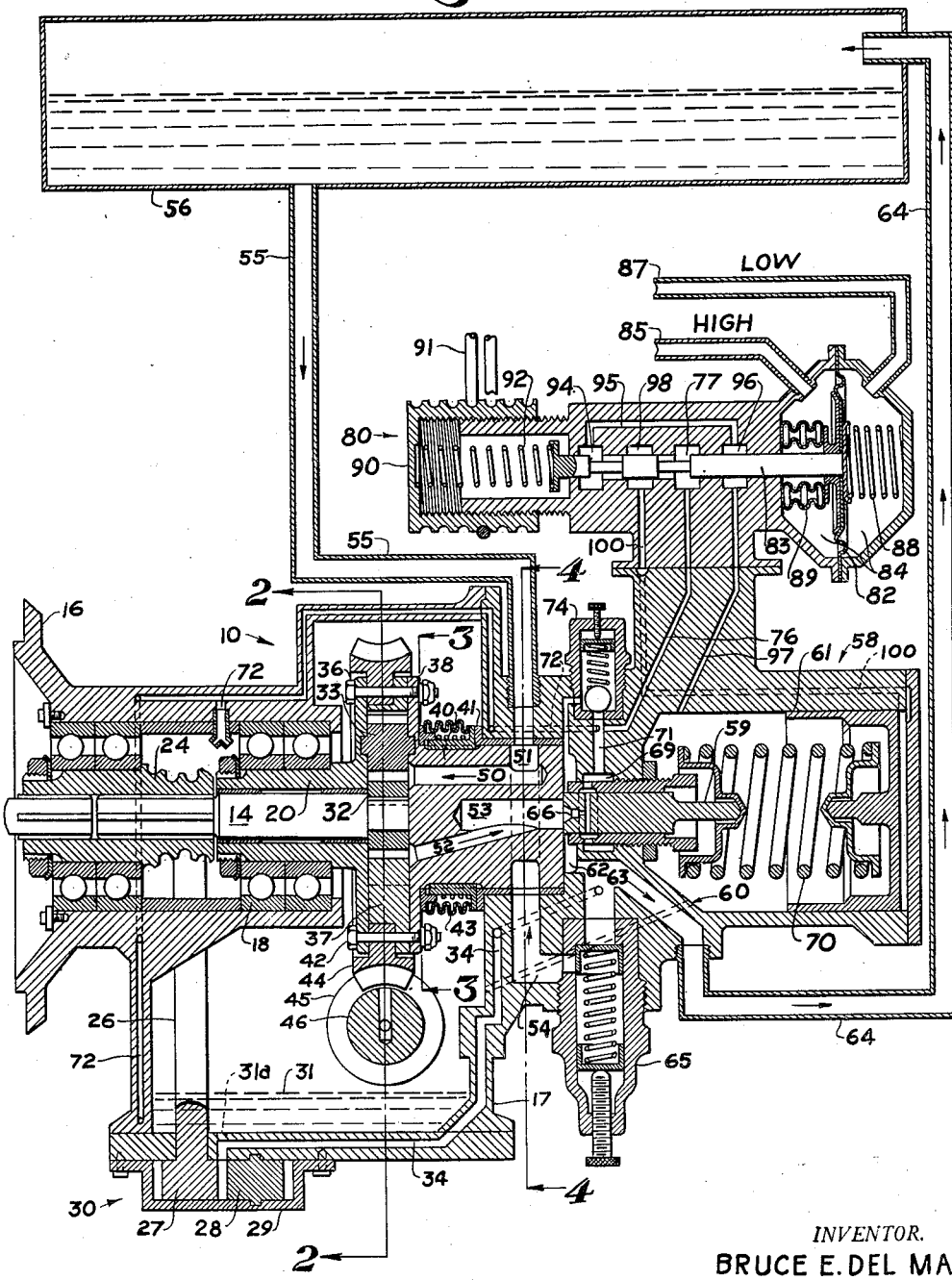
Figure 1 is a partially schematic layout of the preferred embodiment of my invention, showing the principal parts in vertical section.

Figures 3 and 4 are vertical sectional views on lines 3—3 and 4—4 respectively, of Figure 1, and Figure 5 is a schematic layout of another embodiment of my invention, in which the planetary slip pump load relief valve is neither aligned nor in contact with the discharge port of said pump.

In the preferred embodiment of my invention illustrated in Figures 1 to 4, the hydraulic planetary slip drive 10 is shown incorporated in a system for controlling the circulation or pressure of the air in the pressure cabin of an airplane. A supercharger 12 is generally employed in such systems and is intended to be driven at a constant speed under the control of regulating means which will restore the supercharger speed, whenever it is temporarily increased or decreased due to variations in the engine speed or to sudden changes in the air pressure and vent openings in the pressure cabin.

Oil sump gear pump

The hydraulic planetary slip drive 10 comprises a drive shaft 14 connected with a power source such as the airplane engine (not shown) by any desired means such as a flexible drive shaft. The slip drive 10 is enclosed in a casing 16 which supports a bearing 18 in which is journaled a hollow shaft 20 which receives the drive shaft 14. Shaft 14 has its outer end protruding from hollow shaft 20 for continuously driving a conical worm gear 24 and worm wheel 25 (see Figure 2). The worm gear 24 is keyed to the outer end of shaft 14 and conical worm wheel 25 is fixed to the upper end of a shaft 26, which carries at its lower end the pinion gear 27, which meshes with a gear 28 journaled in an enclosing member 29 to form a sump gear pump 30. Pump 30 is positioned beneath an opening 31ª in the oil sump 31 formed in the bottom of casing 16, and operates continuously, pumping the oil draining into the sump 31 into conduit 34 and into discharge conduit 64. The shaft 26 is shown schematically and may be journaled in bearings (not shown) mounted on casing 16.

Hydraulic planetary slip drive

A sun gear 32 is fixed to the inner end of drive shaft 14 and drives planetary gears 33 journaled in the flange 36 of hollow shaft 20 and in the flange 38 of shaft 40. These shaft members 20 and 40 and their flanges 36 and 38 respectively have a substantially oil or liquid tight contact with the side faces of the sun gear 32 and planetary gears 33. An intermediate plate member 37 is secured between the shaft flanges 36 and 38 by bolts 42, and as shown in Figure 2, is provided with recesses shaped to receive the sun gear 32 and planetary gears 33. Said recesses in plate member 37 are proportioned to allow only a small clearance between the walls of the recesses and the adjacent teeth of sun gear 32 and planetary gears 33. Although Figure 1 shows the intermediate member 37 as separate from shaft flanges 36 and 38, it is obvious that member 37 may be integral with either flange 36 or 38 and also with orbit gear 44 which is illustrated as being a separate member connected by bolts 42 to shaft flanges 36 and 38. Orbit gear 44 is shown as a worm wheel which drives cone worm 45 on shaft 46, but it is obvious that any other suitable type of gears may be employed. As shown in Figure 2, cone worm 45 and shaft 46 are coupled, by a spline sleeve 47 directly to the shaft 48 of a conventional supercharger 12.

Although three planetary gears 33 are illustrated in Figures 2 and 3, it is obvious that the system will function as a slip pump and planetary drive with either one or any desired number of planetary gears. For each planetary gear 33, there should be provided one inlet port and one discharge port in the members which enclose the sun gear 32 and said planetary gear. In Figure 1, the inlet port 50 and the discharge port 52 are shown schematically in shaft member 40 while in Figures 3 and 4, they are shown accurately located for the direction of rotation of sun gear 32 and planetary gears 33 shown by the arrows in Figure 2. As shown in Figures 1 and 4, the discharge ports 52 are merged into a single port 53 in alignment with the common axis of shafts 14 and 20, while the inlet ports open into the annular passageway 51. Oil or liquid is received by passageway 51 from reservoir 56 through inlet conduit 55.

*Planetary pump load relief valve*

As shown in Figure 1, shaft 40 is journaled in a bearing sleeve 41 supported by an annular flange 17 in casing 16. An annular flange on bearing sleeve 41 receives the thrust from the oil sealing ring 43 which is keyed to shaft 40. A load relief valve 58 for the planetary slip pump 10 is mounted at one end on the annular flange 17 of casing 16, in axial alignment with shaft 40, in such manner that the plunger 59, which is spring loaded by helical spring 70, seats on the rotating surface of shaft 40 around the exit portion 53 of discharge ports 52. The load relief valve 58 also contacts the rotating surface of shaft 40 and is recessed at 62 around the plunger 59 so as to discharge the oil from port 53 through passageway 63 into conduit 64 whenever the pump pressure builds up sufficiently to unseat the loaded plunger 59. Excessive pressure in conduit 64 and suction in conduit 55 is prevented by recirculating the oil by means of relief valve 65, conduit 54, annular passageway 51 and inlet ports 50, back into the pump 10.

An accurately metered orifice 66 in plunger 59 allows a continuous flow of oil to pass through apertures formed in the cylindrical wall of an adjustable sleeve threaded into the end of the load relief valve, into an annular recess 69. From annular recess 69, the oil is normally forced into a conduit 71 for supplying the different branch conduits 72 of a pressure and spray lubrication supply system, one conduit of which sprays the gearing and bearings as shown schematically in Figure 1, and then drains into the oil sump 31. Other branches of conduit 72 are shown in Figures 1 and 2 in the form of connecting bores in shaft 46. If the pressure should become excessive, part of this oil is by-passed through relief valve 74, recess 62, and passageway 63 into the discharge conduit 64 and reservoir 56.

*Automatic air flow control regulator*

As shown in Figure 1, the oil under continuous pressure in conduit 71, keeps branch conduit 76 filled with oil under pressure. Conduit 76 communicates with chamber 77 in an automatic air flow control regulator 80. Regulator 80 has a diaphragm 82 fixed to one end of a slide valve 83 and located in an airtight chamber 84. As shown in Figure 2, one side of the diaphragm 82 in the chamber 84 communicates through conduit 85 with the relatively high pressure (low velocity) area of the expansion cone 86 of the supercharger 12, while the other side communicates through conduit 87 with the relatively low pressure (high velocity) Venturi section of the expansion cone 86. A differential pressure is thereby obtained across the chamber which increases or decreases as the supercharger speed increases or decreases, and thereby moves the slide valve to the right or left, respectively.

The diaphragm 82 and therefore slide valve 83 is maintained in normal position for any given speed of the supercharger 12 by the loading spring 88, the evacuated aneroid diaphragm 89, and the manually controlled hollow nut 90. Control cable 91, manually operated from the cockpit, adjusts the position of slide valve 83 by changing the loading on spring 92.

In the position of the slide valve 83 shown in Figure 1, any oil leakage from high pressure chamber 77 into low pressure chamber 96 is returned through conduit 97 to the inside of the load relief valve 58, from which it can drain into oil sump 31 through drainage passageway 60. Chamber 98 communicates through conduit 100 with the top of piston 61 of the planetary pump load relief valve 58. Any oil leakage from chamber 98 into chamber 94 is returned through passageway 95, chamber 96, conduit 97 and drainage passageway 60, to sump 31.

*Description of operation*

Let it be assumed that the pump load relief valve 58, the airflow regulator 80 and its slide valve 83, are in the position shown in Figure 1, with sun gear 32 and shaft 46 rotating at their respective speeds. Also assume that the slide valve 83 is moved from the neutral position shown, to the right, either by someone operating cable 91 and hollow nut 90, or by a change of differential pressure across chamber 84 caused by the supercharger 12 being speeded up because of some change of conditions in the pressure cabin affecting the volume of air being delivered by the supercharger. This movement of slide valve 83 to the right allows some of the oil in chamber 98 and conduit 100 to be forced by spring 70 and piston 61 of pump load relief valve 58 into chamber 94, passageway 95, chamber 96, conduit 97, and through drainage passageway 60, to sump 31. This relieves the pressure on plunger 59 of relief valve 58, allowing oil to be pumped from discharge port 53 through recess 62 and passageway 65 into conduit 64. If the oil is cold and viscous in conduit 64, sufficient pressure may be built up to force the oil through relief valve 65 so that it merely recirculates through the pump via conduit 54, annular passageway 51 and inlet ports 50. In ordinary operation, however, the oil in excess of that passing through the metered orifice 66 returns to the reservoir 56 through conduit 64. But in either case, there is enough less resistance offered to the flow of the oil to cause the planetary gears 33 to rotate faster, and consequently, since the speed of sun gear 32 is maintained constant by the engine to cause the orbit gear 44 to lose speed, thereby reducing the rotational speed of shafts 46 and 48 and the supercharger 12, until the differential pressure across the chamber 84 of the regulator 80 is restored to normal. This restoration of the differential pressure to normal causes the diaphragm 82 to move slide valve 83 toward the left, until it has returned to the neutral position shown in Figure 1.

Now let it be assumed that some change in conditions causes the supercharger 12 to begin to lose speed. The differential pressure in chamber 84 is decreased, causing diaphragm 82 to move slide valve 83 to the left, thereby allowing the oil in chamber 77 and conduit 76 to enter chamber 98 and conduit 100. Since the oil in chamber 77 and conduit 76 is always under the direct pressure of the pump 10 via the discharge ports 52, 53, metered orifice 66, annular recess 69, and conduit 71, the oil forced into chamber 98 and conduit 100 exerts a large force on piston 61 of the pump load relief valve 58. This large force on piston 61 is transmitted through spring 70 to plunger 59 and prevents any more oil escaping from discharge port 53 into discharge conduit 64. Since the quantity of oil passing through metered orifice 66 is much smaller than the quantity being pumped, the resistance to flow immediately begins to increase, thereby reducing the speed of rotation of planetary gears 33. Since the speed of sun gear 32 is maintained constant by the engine, the reduction in speed of planetary gears 33 causes the orbit gear 44 to increase its speed, thereby increasing the rotational speed of shafts 46 and 48 and the supercharger 12, until the differential across chamber 84 of the regulator 80 is restored to normal. This restoration of the differential pressure to normal causes the diaphragm 82 to move slide valve 83 toward the right, until it has returned to its neutral position.

It will now be apparent that if the rotational speed of sun gear 32 is increased for any reason, such as when the engine driving said sun gear is the engine of an airplane which is beginning to take off, the planetary gears 33 will speed up and start pumping more oil. Since the slide valve 83 is in its neutral position, the spring loading on plunger 59 does not change. And since approximately the same quantity of oil is passing through metered orifice 66, the increased quantity of oil being pumped unseats plunger 59, thereby allowing the excess oil either to be returned to reservoir 56 through discharge conduit 64, or to be recirculated to the pump through relief valve 65 and conduit 54. In other words, the planetary gear pump acts as a slip drive and the orbit gear 44 continues to rotate at normal speed. It is obvious that the gear 44 will drive the shaft 46 through the cone worm 45 at a higher rate of speed than the rate of rotational speed of the shaft 14 when the gear 44 is rotated with the sun gear 32. If for any reason the increase or decrease in the rotational speed of the sun gear 32 caused a change in the speed of the orbit gear 44, and consequently, of the supercharger, the resulting change in differential pressure across the chamber 84 would move the slide valve 83 of the regulator 80 either toward the right or the left, respectively, until the normal speed of the supercharger was restored.

Where a pump is required to produce higher pressures than are obtainable with the single stage pump resulting from the construction described, it is believed to be obvious to lead one or more of the discharge ports 52 directly to one or more of the inlet ports 50, thereby obtaining a series flow through the planetary gears 33, with a consequent multiplication of pressure.

Embodiment of Figure 5

The schematic arrangement shown in Figure 5 is quite similar to the arrangement shown in Figures 1 to 4, and the same reference numerals are used to designate the parts having similar structure or function, the numerals being primed. In Figure 5, the planetary pump load relief valve 58' is not aligned with the axis of sun gear 32', and its valve plunger 59' does not contact the rotating face of the discharge port of planetary pump drive 10'' as in Figures 1 to 4. This modified arrangement has utility where space is not available to mount the load relief valve 58' directly on the planetary pump drive 10', or when for any reason it is desired to mount them in relatively remote locations. Such arrangement, however, requires a gland in the high pressure line from the slip pump.

The planetary slip drive 10' is disclosed schematically and has a sun gear 32' fixed to one end of a drive shaft 14' which is rotatable in the hollow shaft 20' journaled in a bearing 18'. Planetary gears 33' are journaled between flange 36' of hollow shaft 20' and a cover plate 38'. Said flange 36' and plate 38' contact the side faces of the sun gear 32' and planetary gears 33' with an oil tight fit. The flange 36' is provided with integral formations 37' which are recessed and shaped to receive the sun gear 32' and planetary gears 33'. To facilitate the assembly of the worm wheel orbit gear 44', however, the periphery of said formations 37' is cut away to provide space for a thick washer ring 39'. The orbit gear 44', washer ring 39', and cover plate 38' are secured to flange 36' by bolts 42'. The orbit gear or worm wheel 44' drives the cone worm 45' fixed to shaft 46' which drives a supercharger (not shown).

A non-rotating collecting ring 51' receives oil from the reservoir 56' via inlet conduit 55', for maintaining a constant oil supply at the pump inlet ports 50' provided in the flange 36' of shaft 20'. Discharge ports 52' are provided in rotating cover plate 38' in such manner that they communicate at all times with the nonrotating discharge conduit 53'.

From discharge conduit 53', the oil is pumped continuously through a metered orifice 66' into annular passageway 69', conduit 71' and conduit 72' to oil the bearing 18'. The oil used for lubrication drains into sump 31', from which it is pumped by a gear pump 30' through conduit 34' into conduit 64' and then to reservoir 56'. If the oil pressure in pressure lubrication conduit 72' becomes excessive, the oil is bypassed through relief valve 74' and conduit 75' to conduit 64' and then to reservoir 56'.

When the quantity of oil being pumped by the planetary slip drive 10' overcomes the force acting on load relief valve plunger 59', said plunger 59' is unseated, allowing oil to pass through conduit 64' to reservoir 56'. If the resistance to flow in conduit 64' starts to build up an undesired pressure, the oil is bypassed through the relief valve 65' and conduit 54' for recirculation through the planetary pump 10'.

The automatic air flow control regulator 80' is substantially identical in construction and operation with that disclosed in Figure 1. Oil is supplied continuously under pressure to chamber 77' by conduit 76' from metered orifice 66'. If the differential pressure across conduits 85' and 87' is decreased, thereby causing the diaphragm 82' in chamber 84' to move the slide valve 83' toward the left against the action of spring 92' in hollow nut 90' and against the action of the evacuated aneroid 89' in chamber 84', then the oil in said chamber 77' is forced into chamber 98' and conduit 100' where it can act on piston 61' and spring 70' to hold valve plunger 59' firmly against its seat, thereby increasing the resistance to flow of the oil being pumped, which simultaneously reduces the rotational speed of planetary gears 33' and increases the speed of orbit gear 44' and the supercharger, whereby the differential pressure across the chamber 84' is increased, causing the diaphragm 82' to move the slide valve 83' toward the right to its neutral position.

If the differential pressure across conduits 85' and 87' is increased, causing the diaphragm 82' to move the slide valve 83' toward the right against the action of spring 88', then the oil in conduit 100' and chamber 98' is forced by the spring 70' and piston 61' via the chamber 94', passageway 95', chamber 96' and conduit 97', into the sump 31', which relieves the pressure on valve plunger 59' and allows the oil being pumped to unseat said plunger 59' and discharge into the conduit 64' and reservoir 56', thereby decreasing the resistance to flow of the oil being pumped, which simultaneously speeds up the rotation of planetary gears 33' and slows down the rotation of orbit gear 44' and the supercharger, whereby the differential pressure across chamber 84' is decreased, causing the diaphragm 82' to move the slide valve 83' toward the left to its neutral position.

It will be apparent that any increase or decrease in the speed of the engine driving shaft 14' and sun gear 32' will not affect the speed of rotation of the orbit gear 44' and supercharger, since, the slide valve 83' being in neutral position, the only result will be an increase or decrease in the quantity of oil being pumped due to the increase or decrease, respectively, in the speed of rotation of the planetary gears 33'. In other words, the planetary gear pump acts as a slip drive.

Although my hydraulic planetary slip pump or drive is capable of general application in a wide variety of uses wherever it is desired to maintain a driven member at a constant speed regardless of changes in the speed of the driving member, I believe that its greatest utility is in the field of aviation where the saving in weight and greater efficiency obtainable by its use, is substantial and important.

The claims are therefore intended to cover all changes and modifications of structure which may be fairly regarded as coming within their scope.

I claim:

1. A hydraulic planetary slip drive comprising: a sun gear; a planetary gear; an annular member; means for driving said gears as a planetary system; shaft members fixed to each side of said annular member, said annular member and shaft members enclosing and journaling said sun gear and planetary gear; an inlet port and a discharge port in one of said shaft members whereby said sun gear and planetary gear also operate as a hydraulic slip pump; and a load relief valve supported in contact with the surface of said shaft member containing the discharge port at the outer end of said discharge port.

2. A hydraulic planetary slip drive comprising: a sun gear; a planetary gear; an annular member; means for driving said gears as a planetary system; a hollow shaft member fixed to one side of said member and journaled in a support, said shaft enclosing a portion of said sun gear and planetary gear; means fixed to said hollow shaft for enclosing the remaining portion of said sun gear and planetary gear; a shaft on said sun gear journaled in said hollow shaft; inlet and discharge ports in said enclosing means whereby said sun gear and planetary gear also operate as a hydraulic slip pump, the exit portion of said discharge port being located in axial alignment with said shafts; and a load relief valve supported in axial alignment with said shafts, said valve seating on said enclosing means at said exit portion.

3. A hydraulic planetary slip drive comprising: a sun gear; a shaft for driving said sun gear; a planetary gear; a carrier for rotatably mounting said planetary gear in mesh with said sun gear, said carrier enclosing and forming a housing for said gears; drive means fixedly carried about the periphery of said carrier; means engaging and adapted to be driven by the drive means of said carrier; fluid inlet and outlet passages leading into and out of said carrier; said gears acting as a gear pump to draw fluid from said inlet passages and force it through said outlet passage; resilient pressure limiting means for resisting the flow of fluid through said outlet passage; and adjustment means for said pressure limiting means whereby the variable pressure created within said carrier by said resistance varies the speed of rotation of said planetary gear relative to said carrier to thereby vary the speed of rotation of the means driven by the drive means of said carrier relative to the speed of rotation of the shaft driving said sun gear.

4. A hydraulic planetary slip drive comprising: a sun gear; a shaft for driving said sun gear; a planetary gear; a carrier for rotatably mounting said planetary gear in mesh with said sun gear, said carrier enclosing said gears; a gear fixed about the periphery of said carrier; a driven shaft extending substantially normal to the axis of said drive shaft; a gear carried by said driven shaft in mesh with the gear fixed about the periphery of said carrier and adapted to be driven by the gear of said carrier; fluid inlet and outlet passages leading into and out of said carrier; said gears acting as a gear pump to draw fluid from said inlet passages and force it through said outlet passage; resilient pressure limiting means for resisting the flow of fluid through said outlet passage; and adjustment means for said pressure limiting means whereby the variable pressure created within said carrier by said resistance varies the speed of rotation of said planetary gears relative to said carrier to thereby vary the speed of rotation of the driven shaft relative to the speed of rotation of the shaft driving said sun gear.

5. A hydraulic planetary slip drive comprising: a sun gear; a planetary gear in mesh with said sun gear; a shaft driving said sun gear; a carrier for supporting said planetary gear and housing both said sun gear and said planetary gear together as a gear pump; peripheral gearing on the outer surface of said gear carrier; a gear meshing with and adapted to be driven by said peripheral gearing; a shaft attached to said driven gear; a journal bearing mounting said carrier for rotation concentric with said sun gear; a gland in said journal bearing for furnishing hydraulic fluid to said carrier; inlet passages in said carrier for supplying fluid to said sun and planetary gears whereby the gears act as a pump to draw fluid from said gland; a discharge passage formed within and rotatable with said carrier, the outlet end of said passage being concentric with said sun gear; means for returning fluid from said discharge passage to said inlet passages; and a closure member resiliently held in direct engagement with the outlet end of said discharge passage whereby a variable hydraulic resistance is created to the rotation of said planetary gear relative to said carrier so that variable slip is created to vary the speed of rotation of the driven shaft with respect to the speed of rotation of the drive shaft.

6. A hydraulic planetary slip drive comprising: a sun gear; a shaft for driving said sun gear; a planetary gear; a carrier for rotatably mounting said planetary gear in mesh with said sun gear, said carrier enclosing said gears and forming a housing therefor; drive means fixedly carried about the periphery of said carrier; means engaging and adapted to be driven by the drive means of said carrier; fluid inlet and outlet passages leading into and out of said carrier; said gears acting as a gear pump to draw fluid from said inlet passages and force it through said outlet passage; a valve mounted at the discharge end of said outlet passage; resilient means normally holding said valve in a position closing said outlet passage; and means responsive to the speed of the means driven by the drive means of said carrier for varying the action of said resilient means whereby the variable restriction of flow through said outlet passage produces variable pressures within said carrier to vary the speed of rotation of said planetary gear relative to said carrier and the speed of rotation of the driven means relative to the speed of rotation of the drive shaft.

7. A hydraulic planetary slip drive comprising: a sun gear; a planetary gear in mesh with said sun gear; a shaft driving said sun gear; a carrier for supporting said planetary gear and housing both said sun gear and said planetary gear together as a gear pump; peripheral gearing on the outer surface of said gear carrier; a gear meshing with and adapted to be driven by said peripheral gearing; a shaft attached to said driven gear; a journal bearing mounting said carrier for rotation concentric with said sun gear; a gland in said journal bearing for furnishing hydraulic fluid to said carrier; inlet passages in said carrier for supplying fluid to said sun and planetary gears whereby the gears act as a pump to draw fluid from said gland; a discharge passage in and rotatable with said carrier for receiving the fluid drawn from said gland; a hydraulic load member acting to direct engagement with the outlet end of said discharge passage whereby a variable hydraulic resistance is created to the rotation of said planetary gear relative to said carrier whereby variable slip is created to vary the speed of rotation of the driven shaft with respect to the speed of rotation of the drive shaft; and means for returning fluid from said discharge passage to said gland, said means including a sump and conduits interconnecting said sump and the discharge passage and said gland respectively.

8. A hydraulic planetary slip drive comprising: a sun gear; a planetary gear in mesh with said sun gear; a shaft driving said sun gear; a carrier for supporting said planetary gear and housing both said sun gear and said planetary gear together as a gear pump; peripheral gearing on the outer surface of said gear carrier; a gear meshing with and adapted to be driven by said peripheral gearing; a shaft attached to said driven gear; a journal bearing mounting said carrier for rotation concentric with said sun gear; a gland in said journal bearing for furnishing hydraulic fluid to said carrier; inlet passages in said carrier for supplying fluid to said sun and planetary gears whereby the gears act as a pump to draw fluid from said gland; a discharge passage in and rotatable with said carrier for receiving the fluid drawn from said gland; a hydraulic load member acting to direct engagement with the outlet end of said discharge passage whereby a variable hydraulic resistance is created to the rotation of said planetary gear relative to said carrier whereby variable slip is created to vary the speed of rotation of the driven shaft with respect to the speed of rotation of the drive shaft; means for returning fluid from said discharge passage to said gland, said means including a sump and conduits interconnecting said sump and the discharge passage and said gland respectively; a bypass conduit interconnecting the outlet end of said discharge passage and said gland; and a pressure-responsive valve normally closing said bypass conduit, said valve opening in response to a predetermined pressure difference between liquid in the conduit leading from the outlet end of said discharge passage to said sump and the conduit leading to the gland.

9. A hydraulic planetary slip drive, comprising: a sun gear; a shaft for driving said sun gear; a hollow shaft coaxially mounted on said driving shaft; a planetary gear driven by said sun gear; gear-housing and journaling means terminating the one end of said hollow shaft and including an annular member fixed to the housing and circumscribing the path of travel of said planetary gear; a pressure fluid inlet passage leading to the interior of said housing; a pressure fluid outlet passage leading from the interior of said housing to the exterior thereof whereby said gears are enabled to act as a gear pump drawing fluid from said inlet and forcing it through said outlet passage; resiliently mounted closure means for yieldingly resisting the flow of fluid into said outlet passage; and manually adjustable air-pressure-differential operated control means operatively associated with the outer end of said closure means and operable to control the degree of yielding of said resilient resisting means to vary the action of the last said means.

10. A hydraulic planetary slip drive, comprising: a sun gear; a shaft for driving said sun gear; a hollow shaft coaxially mounted on said driving shaft; a planetary gear driven by said sun gear; gear-housing and journaling means terminating the one end of said hollow shaft and including an annular member fixed to the housing and circumscribing the path of travel of said planetary gear; a pressure fluid inlet passage leading to the interior of said housing; a pressure fluid outlet passage leading from the interior of said housing to the exterior thereof whereby said gears are enabled to act as a gear pump drawing fluid from said inlet and forcing it through said outlet passage; resiliently mounted closure means for yieldingly resisting the flow of fluid into said outlet passage; and an irreversible, manually adjustable air-pressure-differential operated control means operatively associated with the outer end of said closure member and operable to control the degree of yielding of said yieldable, resisting means to vary the action thereof.

11. A hydraulic planetary slip drive, comprising: a sun gear; a shaft for driving said sun gear; a hollow shaft coaxially mounted on said driving shaft; a planetary gear driven by said sun gear; gear-housing and journaling means terminating the one end of said hollow shaft and including an annular member fixed to the housing and circumscribing the path of travel of said planetary gear; a pressure fluid inlet passage leading to the interior of said housing; a pressure fluid outlet passage leading from the interior of said housing to the exterior thereof whereby said gears are enabled to act as a gear pump drawing fluid from said inlet and forcing it through said outlet passage; resiliently mounted closure means for yieldingly resisting the flow of fluid into said outlet passage; a hydraulic cylinder and piston unit mounted around the outer end of said resiliently-resistive unit with the cylinder including inlets onto each of the opposite faces of said piston for hydraulic pressure fluid and an outlet therefor; a load relief valve mounted in flow communication with said pressure fluid outlet passage; a resilient member operatively interposed between said relief valve and the inner face of said piston; and air-pressure-differential operated control means effective to control the alternate flow of fluid to opposite faces of said piston through said inlet passages into said cylinder thereby to vary the effectiveness of said resilient member and to alter the resistance of said load relief valve to the flow of fluid through the aforementioned pressure fluid outlet passage.

BRUCE E. DEL MAR.

REFERENCES CITED

The following references are of record in the file of this patent:

UNITED STATES PATENTS

| Number | Name | Date |
|---|---|---|
| 1,307,488 | Durant | June 24, 1919 |
| 1,748,436 | Arkin | Feb. 25, 1930 |
| 1,878,078 | Walton | Sept. 20, 1932 |
| 1,883,685 | Gasterstadt | Oct. 18, 1932 |
| 2,278,181 | Lieberherr | Mar. 31, 1942 |
| 2,311,257 | Loveday | Feb. 16, 1943 |
| 2,329,594 | Corrigan | Sept. 14, 1943 |
| 2,356,124 | Stieglitz | Aug. 22, 1944 |
| 2,374,708 | Shoults | May 1, 1945 |